United States Patent [19]

Trainer

[11] 4,306,838

[45] Dec. 22, 1981

[54] FORCE TRANSFERRING ELEMENTS

[75] Inventor: Robert V. Trainer, Ocean City, N.J.

[73] Assignee: Roller Bearing Company of America, West Trenton, N.J.

[21] Appl. No.: 79,306

[22] Filed: Sep. 26, 1979

[51] Int. Cl.³ ............................................ F04D 29/20
[52] U.S. Cl. ...................... 416/135; 416/60; 416/244 R; 416/DIG. 3; 64/30 R; 403/298
[58] Field of Search .................. 416/135, 60, 244 R, 416/DIG. 3; 64/16, 27 R, 27 F, 30 R, 30 D, 11 B; 403/298

[56] References Cited

U.S. PATENT DOCUMENTS

| | | | |
|---|---|---|---|
| 1,137,240 | 4/1915 | Sparks | 416/244 R |
| 1,588,986 | 6/1926 | Ohlson | 416/244 R |
| 1,684,601 | 9/1928 | Shpater | 416/244 R |
| 2,353,561 | 7/1944 | Hassett | 403/298 X |
| 2,879,044 | 3/1959 | Gunas | 416/244 R |
| 2,899,129 | 8/1959 | Schwaiger | 416/DIG. 3 X |
| 3,051,372 | 8/1962 | Rockafield et al. | 416/244 R X |
| 3,061,386 | 10/1962 | Dix et al. | 308/184 |
| 3,142,887 | 8/1964 | Hulck et al. | 29/148.4 |
| 3,144,919 | 8/1964 | Foote et al. | 64/30 R |
| 3,319,484 | 5/1967 | Prest | 64/30 R |
| 3,367,687 | 2/1968 | Jenkins | 416/135 X |
| 3,567,335 | 3/1971 | David et al. | 416/244 R |

FOREIGN PATENT DOCUMENTS

| | | | |
|---|---|---|---|
| 851865 | 10/1952 | Fed. Rep. of Germany | 64/30 R |
| 916370 | 8/1954 | Fed. Rep. of Germany | 64/30 R |
| 2247362 | 4/1974 | Fed. Rep. of Germany | 416/60 |
| 1074499 | 10/1954 | France | 416/60 |
| 269297 | 4/1927 | United Kingdom | 416/60 |
| 432039 | 5/1975 | U.S.S.R. | 416/244 R |

Primary Examiner—Everette A. Powell, Jr.
Attorney, Agent, or Firm—Z. T. Wobensmith, 2nd; Z. T. Wobensmith, III

[57] ABSTRACT

Force transferring elements are disclosed which include a metal or plastic hub deep drawn or elongated with a flange extending therefrom and functioning as a force transferring element. The hub and flange may be of one piece with the flange having blades extending outwardly from the hub, the hub around its circumference being provided with a plurality of indented portions or corrugations to provide a spring action for engagement with a shaft. In another form of the invention two similar pieces are utilized each with a deep drawn or elongated hub and having outer rims which together receive a V-belt or the like. The elements may be connected to a shaft for input to the shaft, or may be carried on the shaft as energy converting or driving members.

8 Claims, 5 Drawing Figures

FORCE TRANSFERRING ELEMENTS

BACKGROUND OF THE INVENTION

1. Field of the Invention

This invention relates to force transferring elements adapted to be carried on a shaft for input or output of force with respect to the shaft.

2. Description of the Prior Art

It has heretofore been proposed as shown in the U.S. Pat. to Dix et al., No. 3,061,386 to provide a tolerance ring of resilient metal for seating a shaft or round rod in a receiving opening in a cast hub, the tolerance ring being a split ring and having a plurality of circumferentially arranged corrugations of uniform height and pitch. The U.S. Pat. to Hulck et al., No. 3,142,887 shows the method of making such a tolerance ring.

It has also been proposed for use with pulleys, fans and the like to use a cast construction with the hub secured to a shaft by a key, set screw or the like. The structures now available are expensive and require additional operations for their manufacture to include the provision for securing the same to a shaft.

SUMMARY OF THE INVENTION

In accordance with the invention a disc of sheet material is deep drawn to provide a hub, the remaining portion of the flange extension from the hub being shaped for force input or output as determined by the manner of use. The hub is preferably provided with a plurality of indentations or corrugations which have a spring action for resilient engagement with a shaft which shaft may be a driving shaft or a driven shaft as desired.

It is the principal object of the present invention to provide a force transferring element having a hub with resilient portions as a part thereof for engagement with a shaft and an outer portion for force transfer to or from the shaft, as desired.

It is a further object of the present invention to provide a rotating force transferring element secured to a shaft by resilient or frictional engagement and which is simple and inexpensive to construct and mount on the shaft.

It is a further object of the invention to provide a force transfer device having an integral hub with provisions as an integral part thereof for engagement with a shaft for transfer of force to or from shaft as desired.

It is a further object of the invention to provide a device of the character aforesaid which is simple and inexpensive to construct and which may be shaped in a press.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENTS

Figure 1:
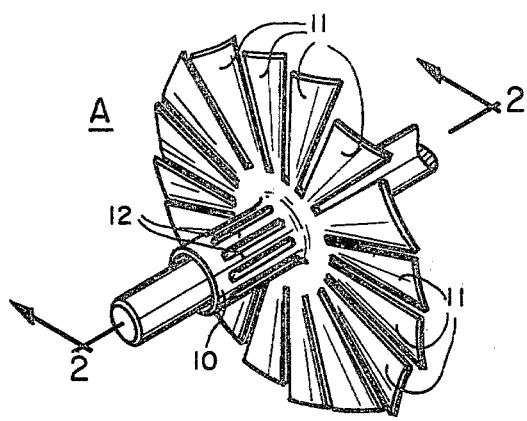
FIG. 1 is a view in perspective of a fan or motor carried on a hub mounted on a shaft for force transfer to or from the shaft.
Figure 2:
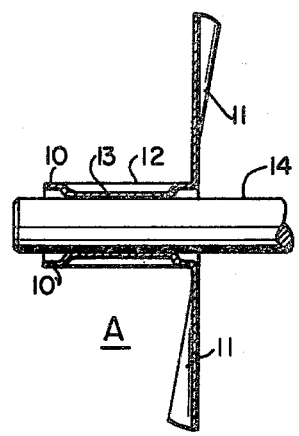
FIG. 2 is a transverse vertical sectional view, taken approximately on the line 2—2 of FIG. 1.

Referring more particularly to FIGS. 1 and 2 of the drawings a force transferring element A is there shown which includes a hub 10 preferably formed or deep drawn from sheet material, such as metal or plastic, and which has extending radially outwardly from the longitudinal axis of the hub 10, and integral therewith, a plurality of blades or vanes 11. The hub 10 is preferably provided with a plurality of corrugations 12 having inwardly extending portions 13 for resilient engagement with a shaft 14. The corrugations may be similar to those shown in the Dix et al. U.S. Pat. No. 3,061,386. The corrugations 12 are shown in a single row around the circumference of the hub 10 and the inwardly extending portions 13 may be of uniform depth or of different depths as desired. The element A is preferably applied to the shaft 14 for retention thereon by pressure applied on the hub 10 axially of the shaft 14 from either end.

Figure 3:
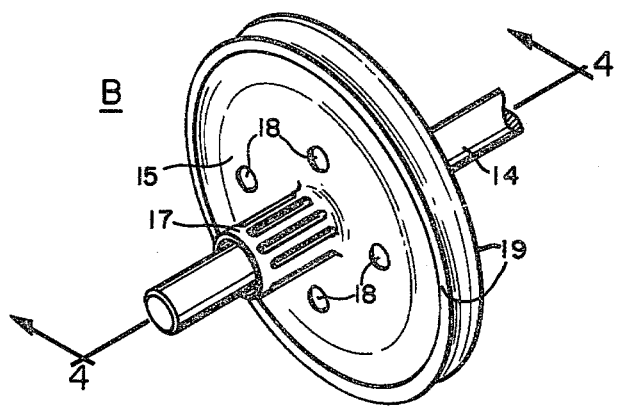
FIG. 3 is a view in perspective of a pulley in accordance with the invention mounted on a shaft and with hub portions extending in both directions.
Figure 4:
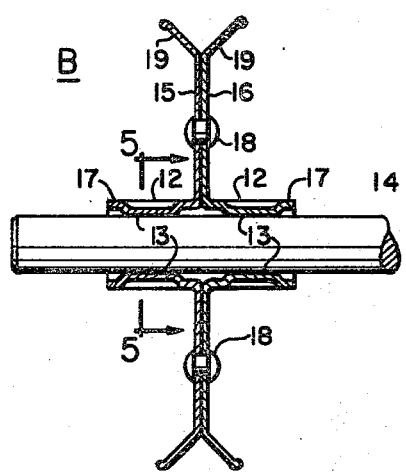
FIG. 4 is a transverse vertical sectional view, taken approximately on the line 4—4 of FIG. 3.
Figure 5:
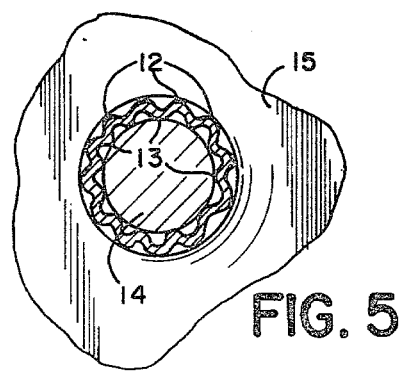
FIG. 5 is a fragmentary sectional view, enlarged, taken approximately on the line 5—5 of FIG. 4.

Referring now more particularly to FIGS. 3 and 4 of the drawings another force transferring element B is there shown, preferably made from sheet material, such as metal or plastic. The element B is preferably of two similar pieces 15 and 16 each having a deep drawn hub 17 with corrugations 12 having inwardly extending portions 13 for resilient engagement with the shaft 14. The pieces 15 and 16 may be secured together by a plurality of rivets 18 and have complemental rim portions 19 to provide for the reception of a V-belt (not shown).

In use, the force transferring element A with vanes 11 as shown in FIGS. 1 and 2 and mounted on the shaft 14 can be employed as a fan with power input from the shaft 14 or as a motor with power input to the shaft 14.

Similarly, in the embodiment of element B, shown in FIGS. 3 and 4 the rim portions 19 may have a driving V-belt (not shown) engaged therewith for rotating the shaft 14 or the shaft 14 may be driven to drive a V-belt (not shown) engaged with the rim portions 19.

I claim:

1. A force transferring element having a hub portion of sheet material and an integral flange portion extending outwardly from said hub portion,
   the hub portion having a plurality of parallel circumferentially spaced inwardly extending corrugations for resilient engagement with a shaft.

2. A force transferring element as defined in claim 1 in which
   said flange portion is provided with a plurality of blades.

3. A force transferring element as defined in claim 1 in which
   a plurality of elements are provided each having elongated hub portions and flange portions integral with and extending outwardly from said hub portions, said flange portions being in engagement.

4. A force transferring element as defined in claim 3 in which
each of said flange portions has outer rims in flared relation to receive a belt.

5. A force transferring element as defined in claim 4 in which
said outer rims are driving elements.

6. A force transferring element as defined in claim 4 in which
said outer rims are driven elements.

7. A force transferring element as defined in claim 2 in which
said hub portion is in driving relation to said blades.

8. A force transferring element as defined in claim 2 in which
said blades are in driving relation to said hub portion.

* * * * *